United States Patent

Hinkley et al.

[15] 3,676,482

[45] July 11, 1972

[54] RACEMIZATION OF AN ALPHA-METHYL DOPA DERIVATIVE

[72] Inventors: David F. Hinkley, Plainfield; Robert L. Ellsworth, Basking Ridge, both of N.J.

[73] Assignee: Merck & Co., Inc., Rahway, N.J.

[22] Filed: March 14, 1969

[21] Appl. No.: 839,739

Related U.S. Application Data

[62] Division of Ser. No. 502,355, Oct. 22, 1965, abandoned.

[52] U.S. Cl.........................260/471 H, 260/465 D, 260/519
[51] Int. Cl........................................................C07c 103/22
[58] Field of Search .................................260/519, 470, 465

[56] References Cited

FOREIGN PATENTS OR APPLICATIONS 1,372,199    8/1964    France

OTHER PUBLICATIONS

Eliel. Stereochem. of Carbon Cmps. p. 35 QD481E5.

*Primary Examiner*—Lorraine A. Weinberger
*Assistant Examiner*—L. Arnold Thaxton
*Attorney*—John P. Floyd, Harry E. Westlake, Jr. and I. Louis Wolk

[57] ABSTRACT

A process for racemizing an optically active isomer of an amidoester in a lower alkanol by the use of ammonia which causes trace equilibration.

1 Claim, No Drawings

RACEMIZATION OF AN ALPHA-METHYL DOPA DERIVATIVE

This application is a division of U.S. Ser. No. 502,355 filed Oct. 22, 1965, now abandoned.

This invention relates to a new process for obtaining the optical isomers of a phenyl-substituted α-methyl-α-cyanopropionic acid and its esters, important intermediates in the production of certain optically active α-methylphenylalanines. More particularly, this invention relates to a process for preparing the foregoing cyano esters, resolving the racemates to give the desired enantiomorph in substantially pure form, and racemizing the unwanted enantiomorph for recycle.

α-Methyl-β-(3,4-dihydroxyphenyl)alanine, or α-methyl-DOPA as it is usually called, has been demonstrated to be a potent antihypertensive agent in man. The 4-hydroxy analog, commonly called α-methyltyrosine, is a promising tranquilizer. The activity of these compounds is in the L-form. The D-forms are completely inactive as antihypertensive or tranquilizing agents, but are equally as toxic as the L-form. It is therefore important to obtain the L-form, free of the D-form for use in medicine.

Exemplary of the manner in which L-hydroxyphenyl-α-alkyl-alanines are presently produced is the preparation of α-methylDOPA. The synthesis of this compound usually proceeds from methyl vanillyl or veratryl ketone is one of two ways. Either the ketone is reacted with ammonium carbonate and a cyanide salt to form a hydantoin, which upon hydrolysis delivers the corresponding α-methyl methoxy hydroxy (or dimethoxy) phenylalanine, or the ketone is reacted with ammonium cyanide to form an α-amino-α-vanillyl (or veratryl) propionitrile, which can be hydrolyzed stepwise to the corresponding amide and then simultaneously demethylated and hydrolyzed to form the dihydroxyphenyl-alanine. These prior methods generally resolve the optical isomers at the end of the synthesis, or at an intermediate stage in assembling the molecule.

However, such procedures result in an accumulation of unusable D-form, which cannot be readily racemized or economically degraded to an intermediate which can be reused, or they result in processing complications at an intermediate stage where the usual losses of separation and racemization consume expensive intermediates. Consequently, there continues to be a need for a more economical commercial synthesis.

The primary object of this invention is to provide an optically active intermediate which can simply and economically be converted to the desired optically active α-methyl-phenylalanines. A further object is to provide a unique method for the synthesis and resolution of such intermediates. Another object is to provide a process for the synthesis of the cyano ester intermediates of this invention which employs reagents that are simply and cheaply produced from readily available raw materials. These and other objects of this invention will appear more fully hereinafter.

In accordance with this invention, the α-methyl-α-cyanophenylalanines and esters of this invention, in the desired optically active form, are produced by a process which comprises (1) contacting a compound having the formula:

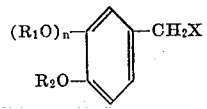

wherein $R_1$ and $R_2$ can be the same or different and are hydrogen or lower-alkyl, $n$ is 0 or 1, and X is halo, or dilower-alkylamino, with a lower -alkyl ester of α-cyanopropionic acid and concomitantly removing hydrogen halide (for example, by using a suitable amount of base) to produce a compound having the formula

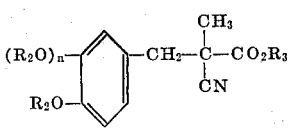

wherein $R_1$, $R_2$, and n are as defined above and $R_3$ is lower alkyl, (2) hydrolyzing said lower-alkyl ester to produce a compound having the formula;

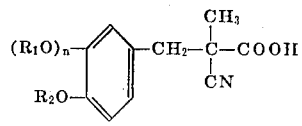

wherein $R_1$, $R_2$, and $n$ are as defined above, as a racemic mixture of D and L isomers, (3) resolving said racemic mixture and separately recovering the resulting resolved D and L isomers as the lower-alkyl ester, (4) contacting said recovered D isomer with an aqueous solution of a strong acid to produce an amido ester having the formula:

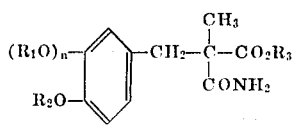

in the D configuration wherein $R_1$, $R_2$, $R_3$ and n are as defined above, (5) racemizing said D amido ester to produce a racemic mixture of D and L isomers of said amido ester and (6) containing said racemic mixture with a dehydrating agent to produce the corresponding compound wherein the amide function is reconverted to the original nitrile function. The preparation of α-methyl-α-cyano-β-(3,4-di-lower-alkoxyphenyl)propionic acid ester which comprises contacting a 3,4-dialkoxybenzyl halide with a lower-alkylester of α-cyanopropionic acid to produce a lower-alkylester of α-cyano-α-methyl-β-(3,4-dialkoxyphenyl)propionic acid, contacting said ester with an aqueous solution of a strong acid to hydrolyze said ester and produce the corresponding free acid as a racemic mixture of D and L isomers, resolving said racemic mixture and recovering the L isomer thereof and recycling the D isomer by a process of (1) hydrolysis of the cyano group to a carbamoyl group, (2) racemizing the resulting amide by contact with a small amount of a base (generally a strong base), and (3) dehydrating the resulting racemate to produce the lower-alkyl ester of α-cyano-α-methyl-β-(3,4-dialkoxyphenyl)propionic acid as a racemic mixture is a preferred embodiment of this invention. Another preferred embodiment is the foregoing embodiment, wherein a 4-alkoxy-benzylhalide is employed to produce the corresponding cyanoester, i.e., the lower-alkyl ester of α-cyano-α-methyl-β-(4-alkoxyphenyl)propionic acid.

The following examples more fully demonstrate this invention.

EXAMPLE I

A. 3,4-Dimethoxybenzylchloride

To a solution of 138 g. (1.0 mole) veratrole in 500 ml. of benzene saturated with hydrogen chloride at 10° C. is added 37.6 g. (0.42 mole) of paraformaldehyde [(HCHO)$_3$]. The slurry is then stirred at 10° C. rising to 40° C. while hydrogen chloride is bubbled through for 90 min. The solution is filtered and concentrated under reduced pressure to a residual oil which is fractioned at 115°–118°/1 mm. to give a distillate solidifying to a white solid, 3,4-dimethoxy-benzylchloride.

B. 4-Methoxybenzylchloride

To a solution of 108 g. (1.0 mole) of methoxy-benzene in 500 ml. of benzene saturated with hydrogen chloride at 10° C. is added 37.6 g. (0.42 mole) of paraformaldehyde [(HCHO)$_3$]. The slurry is then stirred at 10° C. rising to 40° C. while hydrogen chloride is bubbled through for 90 min. The solution is filtered and concentrated under reduced pressure to a residual oil which is fractionated to give a distillate solidifying to a white solid, 4-methoxy-benzylchloride.

EXAMPLE II

A. Preparation Of The Methyl Ester Of α-methyl-α-cyano-β-(3,4-dimethoxyphenyl)propionic acid To a solution of sodium methoxide prepared from 11.5 g. (0.5 mole) of sodium in 400 ml. of dry methanol is added a solution of 56.5 g. (0.5 mole) of methyl ester of α-cyanopropionic acid in 60 ml. of methanol over one hour at 25° C. To this solution of the cyanoester enolate is added a solution of 93.3 g. (0.5 mole) of 3,4-dimethoxybenzyl chloride in 100 ml. of methanol over 30 min. and the resulting mixture is heated to reflux for four hours. The mixture is cooled, the salt removed by filtration, and the filtrate concentrated under reduced pressure to a residual oil which, upon addition of 200 ml. of hexane, crystallizes on cooling, giving a good yield of the product, the methyl ester of α-methyl-α-cyano-β-(3,4-dimethoxyphenyl)propionic acid.

Preparation Of The Methyl Ester Of α-methyl-α-cyano-β-(4-methoxyphenyl)propionic acid The procedure of Example II(B) is followed, with the exception that 0.5 mole of 4-methoxybenzyl chloride is employed in place of 0.5 mole of 3,4-dimethoxybenzyl chloride, to produce the corresponding methyl ester of α-methyl-α-cyano-β-(4-methoxyphenyl)propionic acid.

The procedure of Example II is repeated, using the ethoxy, n-propoxy, i-propoxy, n-butoxy, t-butoxy, and the like alkoxy analogs of 4-methoxybenzyl chloride, in equivalent molar amounts, to produce, respectively, the methyl ester of α-methyl-α-cyano-β-(4-ethoxyphenyl)propionic acid; α-methyl-α-cyano-β-(4-n-propoxyphenyl)propionic acid; α-methyl-α-cyano-β-(4-i-propoxyphenyl)propionic acid; α-methyl-α-cyano-β-(4-n-butoxyphenyl)propionic acid; α-methyl-α-cyano-β-(4-t-butoxyphenyl)propionic acid. Likewise, various hydrocarbyl esters can be produced, using the procedures of Example II, by substituting for the methyl-α-cyano propionate employed therein, the corresponding ethyl, i-propyl, n-butyl, hexyl, octyl, and the like α-cyano propionates, to produce the corresponding alkyl ester derivatives.

The preparation of the α-lower-alkyl-α-cyano-β-(p-alkoxylatedphenyl)propionic acid esters involves a nucleophilic displacement which can be effected by utilizing a labile leaving function other than halide. For example, in place of the p-alkoxybenzyl halide, the tosyl or mesyl derivatives of the corresponding benzyl alcohol may be employed. Preparation of the corresponding p-hydroxy compounds, however, proceeds via eliminiation-addition (on the intermediate quinone methide), and not only all the above leaving groups may be employed, but also the N-di-lower-alkyl derivative, for example, N-dimethyl vanillyl amine. Furthermore, other alkali metals and alkanols can be employed in place of the sodium and methanol in Example II, depending upon what lower-alkyl ester is desired. Exemplary of the alkali metals are potassium, lithium, rubidium, and cesium, and the alcohols ethanol, propanol, butanol, and the like can be employed.

In carrying out these nucleophilic displacements, since the reaction proceeds on a stoichiometric basis, it is generally preferred to employ stoichiometric amounts of all reactants. HOwever, the p-hydroxybenzyl amine compounds react on an auto-catalytic basis and in the latter case, it is preferred to employ from about 5 to about 10 percent of the alkali metal alkoxide, (i.e. 0.05–0.1:1 of said alkoxide to the foregoing mentioned dialkylamine.

It should be noted, that in addition to the alkali metal alkoxides, other enolyzing agents can be employed, such as alkali metal hydrides, for example, sodium hydride, potassium hydride, and lithium hydride; alkali metal sands or dispersions, such as potassium or lithium sand dispersions, or other conventional enolyzing agents.

In general, the temperature of the nucleophilic displacement step of this invention does not appear to be critical and can be conducted at a temperature sufficient to initiate the reaction, but below the decomposition temperature of the reactants and products. In most instances, this temperature falls within the range from about 25° C. to about 100° C. Any inert solvent, that is any solvent which will not interfere with the desired reaction, can be employed, as, for example, benzene and other inert aromatic hydrocarbon solvents, hexane, and the like inert aliphatic carbon solvents, inert ethers such as tetrahydrofuran, and the like inert solvents.

EXAMPLE III

Resolution Of Cyanoester to a solution of 87.7 g. (0.33 mole) of the methyl ester of DL-α-methyl-α-cyano-β-(3,4-dimethoxyphenyl)propionic acid in 300 ml. of five percent aq. acetone is added 1.0 ml. of conc. sulfuric acid under stirring at 25° C. After one hour the solution is added to a column of 250 g. (0.63 mole) of brucine thoroughly admixed with 250 g. of Supercel. The filled column is allowed to equilibrate for two hours and is then eluted with 400 ml. of acetone-petroleum ether (1:3) at a rate of 40 ml./hr. The fraction containing the soluble brucine salt of the L-cyanoacid is concentrated and dissolved in slightly acidified methanol, which gives on reconcentration, a precipitate of methyl ester of L-α-methyl-α-cyano-β-(3,4-dimethoxyphenyl)propionic acid.

Leaching of the column with neat acetone gives the less-soluble brucine salt which on similar work-up yields the D-cyanoester, the methyl ester of D-α-methyl-α-cyano-β-(3,4-dimethoxyphenyl)propionic acid.

Similarly, the resolution of the methyl ester of D,L-α-methyl-α-cyano-β-(4-methoxyphenyl)propionic acid can be effected by substituting this racemic compound for the dimethoxy derivative employed in Example III.

The resolution illustrated by the foregoing examples can be carried out using other optically active bases as a resolving agent, as for example, cinchonine, cinchonidine, quinine, quinidine, strychnine, morphine, 1-menthylamine, d- and 1-α-phenylethylamine, d-2-amino-1-hydroxyhydrindene, L-arginine and α-methylbenzyl amine. Although in the foregoing examples, the resolution is effected by producing a salt of the free acid, resolution can be effected via a free phenolic function, using the foregoing resolving agents. For example, the 4-hydroxyphenyl analogs can be resolved in this fashion.

In addition to the inverse resolving technique employed in Example III, which involves recovery of the less soluble salt after elution of the other salt, the more conventional batch selective crystallization technique, yielding the less soluble salt directly can also be utilized.

EXAMPLE IV

Preparation Of Amidoester

One mole (263 g.) of the methyl ester of D-α-methyl-α-cyano-β-(3,4-dimethoxyphenyl)propionic acid is dissolved in 2 kg. of 85 percent sulfuric acid and heated under stirring at 100°–110° C. for 12–15 hours. The solution is cooled, poured slowly into cracked ice under stirring and then extracted 3 × 333 ml. of methylene chloride. The combined extracts are washed with dilute bicarbonate, dried and concentrated in vacuo to a yellow gum. The residue is digested with 3 × 500 ml. of methanol and then reconcentrated to low volume (300 ml.) in vacuo to give a heavy slurry, which on cooling over ice yields 259 g. (0.92 mole) of the methyl ester of D-α-methyl-α-carbamoyl-β-(3,4-dimethoxy-phenyl)propionic acid.

When the foregoing Example IV is repeated utilizing the 4-methoxy homolog, the corresponding methyl ester of D-α-methyl-α-carbamoyl-β-(4-methoxyphenyl)propionic acid is prepared.

The foregoing hydrolysis of the cyanoester to the amidoester (the terms "amido" and "carbamoyl" are interchangeably used herein) can be carried out using other hydrolysis techniques. For example, in addition to the sulfuric acid employed in the foregoing example, other mineral acids can be employed, as for example, dilute hydrochloric acid. Still another procedure for converting the cyanoester into the corresponding amide involves the use of sulfuric acid monohydrate. Hydrogen peroxide can also be employed, using alkaline conditions. Another procedure comprises heating the cyanoester with polyphosphoric acid. Conversion of the nitrile function of the cyanoester to the amidoester can also involve the use of methanolic hydrogen chloride to produce the corresponding iminoether, followed by pyrolysis to the desired amidoester.

EXAMPLE V

Racemization Of The D-Amidoester

To 1 l. of xylene containing 1.0 g. (0.0184 mole) of sodium methylate is added 10 ml. of methanol containing 0.16 g. (0.0092 mole) of ammonia and 259 g. (0.092 mole) of the methyl ester of D-α-methyl-α-carbamoyl-β-(3,4-dimethoxyphenyl)propionic acid in a stirred autoclave. The mixture is heated under stirring for 4 hours at 170° and then cooled and washed with cold 0.1 N hydrochloric acid. The xylene layer is then concentrated in vacuo to low volume, diluted with 1 l. of methanol and reconcentrated in vacuo to about 300 ml. to give a heavy slurry, which on cooling over ice, gives good yields of the methyl ester of DL-α-methyl-α-(3,4-dimethoxyphenyl)propionic acid.

Similarly, the other optically active amido alkyl esters can be so racemized, as for example, the ethyl, propyl, butyl esters, and corresponding branch chain derivatives thereof, as well as mono- and dialkoxy analogs of the D-amidoester starting material used in Example V, such as 3,4-diethoxy, 3,4-dipropoxy, 3,4-dibutoxy, 4-methoxy, 4-ethoxy, 4-propoxy, 4-butoxy, and the like to produce the corresponding alkyl esters of an α-methyl-α-carbamoyl-β-(alkoxylatedphenyl)propionic acid.

The foregoing example demonstrates the racemization of the unwanted optically active isomer for recycle in the process of this invention. It should be noted that this racemization employs a novel trace equilibration principle to convert the asymmetric carbon of the D-amidoester to its optically inactive or racemized form via trace equilibration with the non-asymmetric diamide. This is therefore a preferred embodiment of this invention, since it provides an extremely simple, straight-forward and economical racemization technique, which has broad potential applicability to a number of other optically active systems where there is comparable equilibria as for example, the reversible hydrolysis-dehydration of an asymmetric geminal cyanamide to the symmetrical diamide in the presence of a large volume of phosphorus acid.

EXAMPLE VI

Preparation of the DL-cyanoester from the corresponding DL-Amidoester

The 228 g. (0.81 mole) of the DL-amidoester, dissolved in 500 ml. of sym.-tetrachloroethane is added 300 g. of Supercel and 173 g. (1.22 moles) of phosphorus pentoxide. The mixture is refluxed under stirring for five hours, cooled and quenched into 1.5 l. of water. The Supercel is removed by filtration and the filtrate layers separated. The organic layer is concentrated in vacuo to low volume, flushed 3 X 500 ml. of hexane in vacuo and finally reconcentrated to a residual volume of 350 ml. Cooling to 0°-5° C. for two hours gives 168.5 g. (0.64 mole), if the methyl ester of DL-α-methyl-α-cyano-β-(3,4-dimethoxyphenyl)propionic acid.

The procedure of Example VI can also be employed in the conversion of the methyl ester DL-α-methyl-α-carbamoyl-β-(4-methoxyphenyl)propionic acid to the corresponding cyanoester.

The foregoing DL cyanoester is suitable for recycle to the resolution step, for example, that described in Example III above. It can therefore be seen that this invention provides an excellent method for utilizing the unwanted optical isomer in the preparation of the commercially important enantiomorph.

For example, in the foregoing series of examples, the L form of the methyl ester of α-methyl-α-cyano-β-(3,4-dimethoxyphenyl)propionic acid is suitable for conversion to the therapeutically important hypotensive agent, L-α-methyl-DOPA, since the L form of the cyanoester intermediate is rendered free of the D form with out concomitant accumulation of unusable D form.

In addition to the dehydration procedure set forth in Example VI, which employs phosphorus pentoxide, other reagent techniques can be utilized, for example, the dehydration can be carried out by utilizing halides or anhydrides of organic or inorganic acids in the presence of heat, or utilizing catalytic methods (see Chemical Reviews, 42, 189). Exemplary of inorganic halides, are phosphorus pentachloride, phosphorus oxychloride, thionyl chloride. Exemplary of acid anhydrides which can be employed are acetic anhydride, succinic anhydride, and the like. By utilizing the foregoing dehydration agents, a wide range of the optically active amidoesters of this invention can be converted to the corresponding racemic amidoesters. For example, the ethyl, propyl and butyl esters of the α-methyl-α-carbamoyl-β-(3,4-dimethoxyphenyl)-propionic acid, or such esters of the α-methyl-α-carbamoyl-β-(4-methoxyphenyl)propionic acid can be converted to the corresponding cyanoesters, utilizing the above-described dehydration agents. Likewise, other alkoxylated phenyl analogs can be so converted, as for example, the ethoxy, propoxy, butoxy, mono– and di-substituted analogs of such α-methyl-α-amido-(alkoxylatedphenyl)propionic acid esters.

When Examples V and VI are repeated using equal proportions of other optically active amidoesters, in place of the methyl ester of α-methyl-α-methyl-carbamoyl-β-(3,4-dimethoxy-phenyl)propionic acid employed therein, similar yields of the desired racemate are obtained. For example, the methyl ester of D-α-methyl-α-carbamoyl-β-(4-methoxyphenyl propionic acid gives the methyl ester of D,L-α-methyl-α-cyano-β-(4-methoxyphenyl)propionic acid; ethyl ester of D-α-methyl-α-carbamoyl-β-(3,4-diethoxyphenyl)propionic acid gives the ethyl ester of D,L-α-methyl-α-cyano-β-(3,4-diethoxyphenyl)-propionic acid; the i-propyl ester of D-α-methyl-α-carbamoyl-β-(3,4-di-n-butoxyphenyl)propionic acid; gives the i-propyl ester of D,L-α-methyl-α-cyano-β-(3,4-di-n-butoxyphenyl)-propionic acid; the sec-butyl ester of D-α-methyl-α-carbamoyl-β-(3,4-di-n-butoxyphenyl)propionic acid gives the sec-butyl ester of D,L-α-methyl-α-cyano-β-(3,4-di-n-butoxyphenyl)propionic acid; and similarly, other alkyl esters of an optically active α-methyl-α-carbamoyl-β-(alkoxylated-phenyl)propionic acid give the corresponding ester of a D,L-α-methyl-α-cyano-β-(alkoxylatedphenyl)propionic acid. In general, the D-enantiomorph is employed in preparation of the racemate, since it is the L form which exhibits the desired end-use properties, as has been discussed above. Thus, it is the D-form which is available for racemization and recycle in the process of this invention.

What is claimed is:

1. The process which comprises contacting the D-optically active isomer of an amidoester having the formula

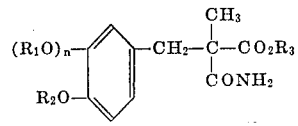

wherein $R_1$, $R_2$ and $R_3$ can be the same or different and are lower alkyl, and $n$ is 0 or 1, with a minor amount of ammonia and a strong base and a substantial excess amount of $R_{1OH}$, said amounts being sufficient to effect racemization.

* * * * *

UNITED STATES PATENT OFFICE
CERTIFICATE OF CORRECTION

PATENT NO. : 3,676,482
DATED : July 11, 1972
INVENTOR(S) : David F. Hinkley et al.

It is certified that error appears in the above-identified patent and that said Letters Patent are hereby corrected as shown below:

Column 1, line 25 - After "ketone" delete [is] and insert in its place _in_.

Column 1, second structural formula "$(R_2O)_n$" should read "$(R_1O)_n$".

Column 2, line 26 - After "(6)" delete [containing] and insert in its place _contacting_.

Column 2, line 61 - After "which is" delete [fractioned] and insert in its place _fractionated_.

Column 3, line 14 - Insert "B. " before the word "preparation".

Column 5, line 18 - After the second "$\alpha$" insert "$\beta$-".

Column 5, line 57 - After "mole)" delete [if] and insert in its place _of_.

Column 6, line 31 - Delete the third "methyl" in the line.

Column 6, Claim 1, line 65 - Delete [$R_{10H}$] and insert in its place $R_1OH$.

Signed and Sealed this thirtieth Day of December 1975

[SEAL]

Attest:

RUTH C. MASON
Attesting Officer

C. MARSHALL DANN
Commissioner of Patents and Trademarks